Figure 1:
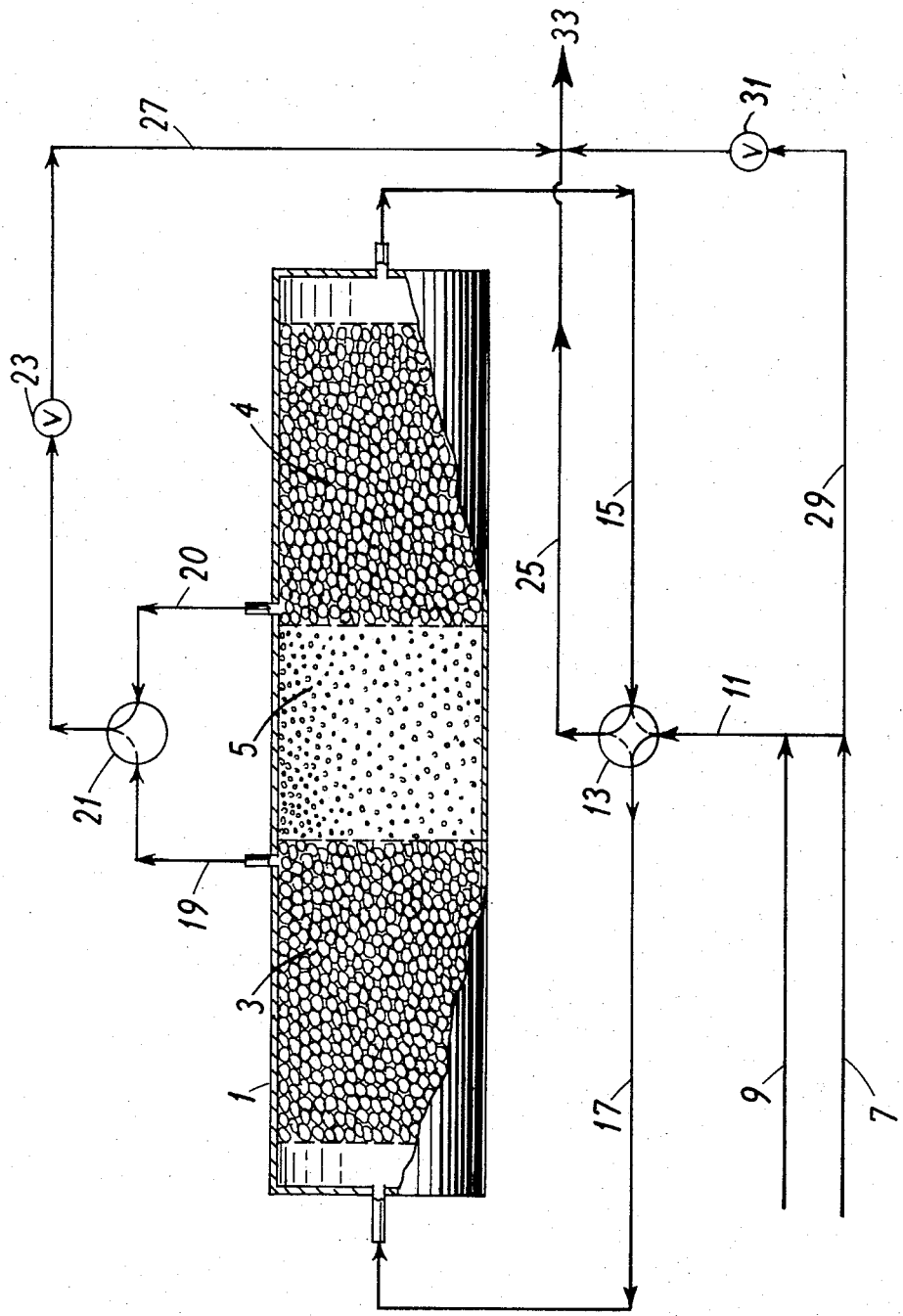

{ # United States Patent [19]

Watson

[11] 3,865,927
[45] Feb. 11, 1975

[54] METHOD AND APPARATUS FOR REACTING SULFUR DIOXIDE AND NATURAL GAS

[75] Inventor: William E. Watson, Mt. Tabor, N.J.

[73] Assignee: Allied Chemical Corporation, New York, N.Y.

[22] Filed: Sept. 15, 1970

[21] Appl. No.: 72,455

[52] U.S. Cl. .............................................. 423/570
[51] Int. Cl............................................ C01b 17/04
[58] Field of Search ............. 23/226, 277, 288, 181; 263/19

[56] References Cited
UNITED STATES PATENTS

| | | | |
|---|---|---|---|
| 2,050,708 | 8/1936 | Lindblad................................ | 23/226 |
| 2,121,733 | 6/1938 | Cottrell.................................. | 23/277 |
| 2,431,236 | 11/1947 | Fleming et al......................... | 23/226 |
| 2,672,671 | 3/1954 | Robinson............................... | 263/19 |
| 2,731,335 | 1/1956 | Odell ..................................... | 23/288 X |
| 2,898,202 | 8/1959 | Houdry et al.......................... | 23/2 S |
| 3,199,955 | 8/1965 | West et al.............................. | 23/226 |
| 3,495,941 | 2/1970 | Van Helden........................... | 23/226 |

*Primary Examiner*—G. O. Peters
*Attorney, Agent, or Firm*—Gerard P. Rooney

[57] ABSTRACT

This invention relates to a method and apparatus for chemically reducing sulfur dioxide with a reducing gas to elemental sulfur and/or other gaseous sulfur compounds by passing the reaction mixture through a reactor system in heat exchange relationship with a gas permeable bed of solid refractory material, said bed comprising a section of substantially catalytically inert material and at least one section of catalytically active material wherein the reaction mixture passes first through the catalytically inert material to heat the mixture and then through the catalytically active material wherein reaction is effected under exothermic reaction conditions, cooling the product gases by passing them through a second section of the catalytically inert material and periodically reversing the direction of gas flow through said reactor to maintain in said catalyst section a temperature sufficient to promote the catalytic reduction of the sulfur dioxide gas.

15 Claims, 2 Drawing Figures
}

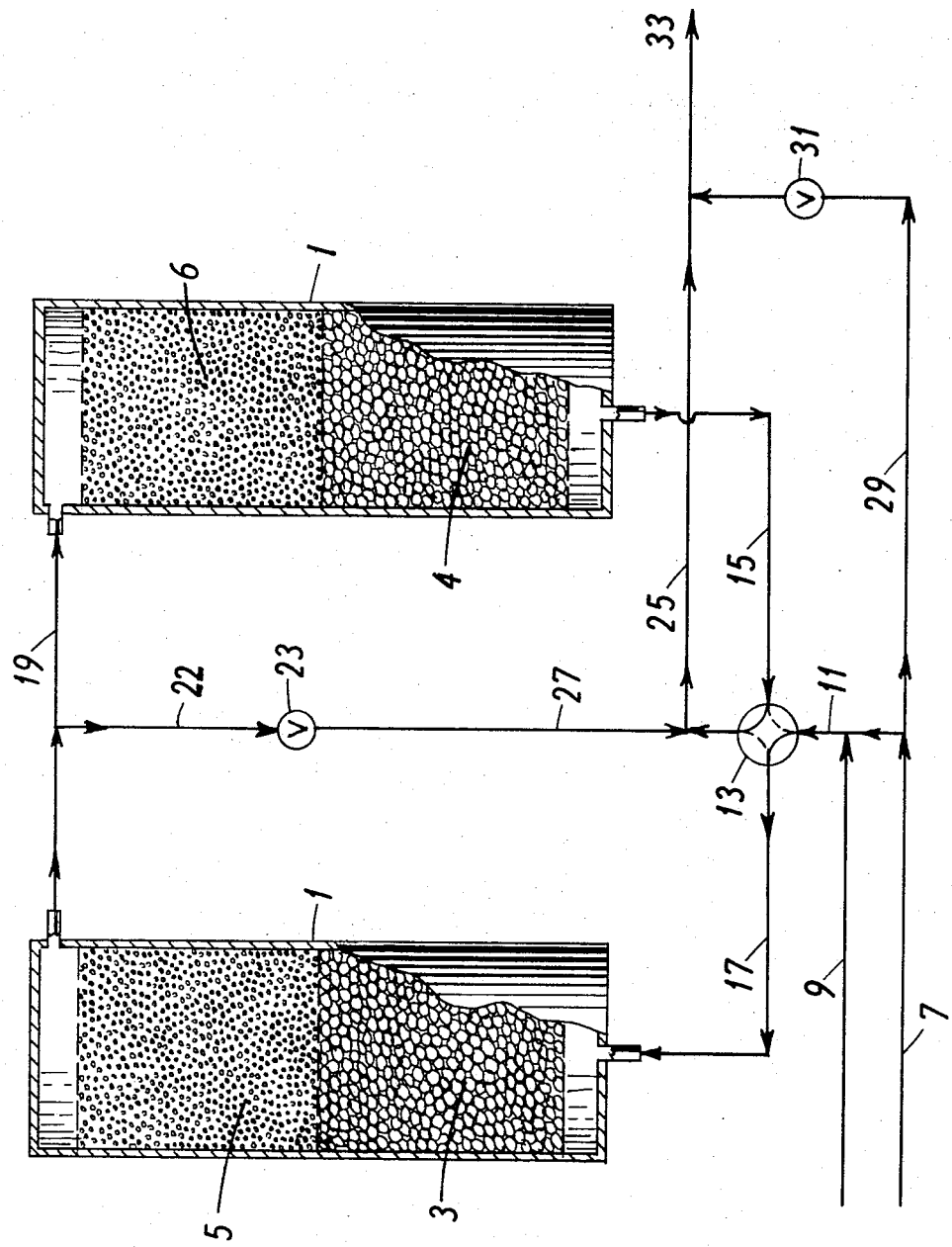

METHOD AND APPARATUS FOR REACTING SULFUR DIOXIDE AND NATURAL GAS

This invention relates to a method and apparatus for the reduction of sulfur dioxide with a reducing gas to elemental sulfur and/or other gaseous sulfur compounds in the presence of a catalyst by the procedure of passing the gaseous reaction mixture through a preheated pervious bed of refractory material, thereby heating the mixture to approximately 1,500°F., then through a preheated pervious refractory catalyst bed maintained at a temperature of between 1,200° and 2,500°F. wherein chemical reduction of the sulfur dioxide takes place, passing the hot product gas through a second, but essentially cool pervious bed of refractory material to thus give up much of its heat in raising the temperature of the bed, and finally exiting at a temperature sufficient to prevent condensation of the contained sulfur, periodically reversing the flow of reactants through the system, so the relatively cool incoming reaction mixture will be heated by the hot bed through which the product gases previously passed, and passing the hot gases from the exothermic reduction reaction through the relatively cool pervious refractory bed which, before the reversing operation, had given up most of its heat to the incoming reaction mixture.

This invention is useful in providing a practical and inexpensive means of recovering sulfur values from metallurgical and similar sulfur containing gases, reducing air pollution, and improving the economics of metallurgical and other processes which have gaseous exits rich in sulfur dioxide.

The reaction of sulfur dioxide and natural gas (methane) is a first step in the production of elemental sulfur from sulfur dioxide-containing gas streams such as those produced by the roasting, smelting, and sintering of chalcopyrite ($CuFeS_2$), iron pyrites ($FeS_2$), pyrrhotite ($FeS$) or other metallic sulfide ores during metallurgical operations. Sulfur dioxide is also found in the exit gases from power plants using high sulfur coal or other sulfurous ores, and from other industrial operations involving the combustion of sulfur bearing fuels. The emission of such gases not only pollutes the atmosphere, but represents an uneconomic and an almost unconscionable waste of a valuable natural resource.

At 1,200°–2,500°F. with a suitable catalyst and under equilibrium conditions, two reactions predominate:

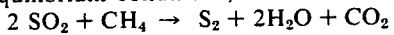

$2 SO_2 + CH_4 \rightarrow S_2 + 2H_2O + CO_2$
$6 SO_2 + 4 CH_4 \rightarrow 4 H_2S + 4 CO_2 + 4 H_2O + S_2$ Any surplus hydrogen sulfide thus generated may be reacted with additional $SO_2$ in a conventional Claus unit for additional sulfur production.

In the past, the reduction of sulfur dioxide has been investigated extensively and there have been many articles published relating to this subject. For instance, in U.S. Pat. Nos. 2,270,427; 2,388,259 and 2,431,236 the reduction of sulfur dioxide with natural gas, such as methane, is described wherein the sulfur values are recovered in an essentially three step reaction. In the first step, sulfur dioxide contained in the off gases from copper smelting operations is reacted with methane at temperatures of approximately 2,280° to 2,360°F. with a refractory material performing as a surface catalyst. The chief sulfur-containing by-products are carbonyl sulfide and hydrogen sulfide. The carbonyl sulfide is then reacted with additional sulfur dioxide at temperatures of about 800° to 840°F. over a bauxite catalyst to produce sulfur and the hydrogen sulfur is reacted with still further amounts of sulfur dioxide at a temperature of about 410° to 450°F. in the presence of bauxite to produce sulfur by the well known Claus reaction.

Likewise, in U.S. Pat. No. 3,199,955 a similar system is disclosed employing three catalytic converters to convert the sulfur dioxide to elemental sulfur, except that in the first, the reduction of sulfur dioxide with methane is achieved at temperatures of 1,470° to 1,830°F. in the presence of a catalyst including activated alumina, bauxite, calcium sulfide and quartz. With this process it is reported that between about 40 and 60 percent of the inlet sulfur dioxide appears in the production gases from the first step as elemental gaseous sulfur, the remainder is found as hydrogen sulfide, carbonyl sulfide, carbon disulfide and sulfur dioxide. The second and third steps of this process are essentially the same as those reported in the earlier patents. The carbonyl sulfide and carbon disulfide are reacted with sulfur dioxide to produce sulfur at a temperature of about 735°F. in the presence of a suitable catalyst, such as alumina; and in the final stage the hydrogen sulfide is reacted with sulfur dioxide at a temperature of about 390° to 530°F. in the presence of a catalyst, such as activated alumina, to produce additional sulfur. A major problem with the processes described in these patents is the high cost of the equipment necessary to carry out the intermediate reaction step of converting the carbonyl sulfide and/or carbon disulfide to additional sulfur.

A similar process is disclosed and discussed in Yushkevich et al's article in ZH.KH.M. PROM., No. 2, pages 33 to 37, (1934) in which a study of the reduction of sulfur dioxide with methane is reported. In this article the authors discuss in detail the various possible reaction products which may be produced, including carbon dioxide, water, carbon monoxide, hydrogen sulfide, carbonyl sulfide, carbon disulfide, and sulfur, depending upon the temperature, flow rate of reactants, and the ratio of reactants employed. At equilibrium conditions it is possible to calculate the composition of the gas mixture that is obtained in the reduction of sulfur dioxide with methane. Under these conditions the methane is completely reacted with the sulfur dioxide as has been previously indicated. Furthermore, essentially no detectable amounts of carbonyl sulfide and/or carbon disulfide are formed in the reduction of sulfur dioxide under equilibrium conditions. Accordingly, when chemical equilibrium is achieved there is no need to provide additional equipment to convert these by-products to additional sulfur as required in the disclosures of the above patents and there is no loss of unreacted methane. Based on experiments conducted by Yushkevich, et al., employing temperatures varying from approximately 700° to 1,000°C., space velocities from 70 to 1,000 (contact times of 1.8 to 26 seconds assuming a bed voidage of 50 percent) and superficial linear velocities of about 0.1 foot per second, the authors concluded that equilibrium is achieved in the reduction of $SO_2$ with methane at temperatures of 800° to 1,000°C., by maintaining the space velocity of the gas reactants through the catalyst bed in the order of up to about 500 (contact time of 3.6 seconds). Yushkevich, et al., found that at temperatures of 900° and 1,000°C., and space velocities of 1,000 (contact time 1.8 seconds), the reaction products contained 2.1 and 0.7 percent methane, respectively. That is, chemical equilibrium was not achieved by Yushkevich, et al., unitl the space velocities were maintained at 500 or below.

As can be appreciated, when the space velocity of the reactants which enter into the reaction is decreased in order to achieve equilibrium, this decrease dictates that process equipment on a larger scale would have to be employed for the same amount of gas treated, thereby substantially increasing the capital cost of a commercial plant.

Normally, metallurgical gases from roasting or sintering operations are at a sufficiently high temperature (in the order of 1,600°F.) so that reaction with a reducing gas in the presence of a catalyst would be spontaneous. Such gases are typically loaded with dusts and volatile metallic impurities, however, which must be removed if the product sulfur is to meet normal commercial standards of quality. Unfortunately, no method for removing the normal impurities of metallurgical gas is known except at temperatures of 150°F. or below. If the purified gases are to be subjected to the catalytic reaction at relatively high temperatures, they must be reheated, which introduces another expense.

Construction of conventional heat exchangers for this purpose is rather impractical because of limited temperature differentials and material of construction problems.

In a more recent concept disclosed in copending U.S. Ser. No. 883,538, filed Dec. 9, 1969 now abandoned, which disclosure is specifically incorporated by reference, the exothermic heat of reaction was utilized by a regeneration procedure using pebble stoves as heat sinks, to reheat the purified gas without introducing external heat. In this disclosure, equilibrium conversions of sulfur dioxide to elemental sulfur and/or other gaseous sulfur products was attained by the use of extremely short contact times and high superficial linear gas velocities through a pervious refractory catalyst bed. Reaction temperatures of 1,700° to 2,000°F. were recommended, with catalyst contact times of 0.5 to 1.5 seconds and superficial linear gas velocities of 2 to 10 feet per second.

The continuous method of producing the product gas in the disclosed process involved the use of three vessels, two being pebble stoves having essentially no catalytic effect on the reaction mixture, and a reactor containing a refractory catalyst. The reaction mixture was first heated by passage through a preheated pervious refractory bed to the reaction temperature. It then passed through the catalytic bed, and the hot gases resulting from the exothermic reduction reaction passed through the second pebble stove, to cool the gas, and by heat exchange, heat the refractory bed. Periodically the gas flow was reversed so that the incoming reaction mixture was heated to the reaction temperature by the stove previously heated by the product gas, and the product gas heated the stove which had just given up much of its heat to the incoming reaction mixture. Regardless of which pebble stove was used to heat the incoming reaction mixture, the heated reaction mixture entered the catalytic chamber from the same end (the top); hence, the gas flow through the reactor was always unidirectional.

A drawback of this disclosure was that three units or chambers are required, namely, a catalytic reactor, and two pebble stoves or heat sinks.

It is an object of this invention to provide an economical method of continuously reducing sulfur dioxide as found, for example, in the off gases from the roasting of sulfide ores in metallurgical processing, by reacting the sulfur dioxide with a reducing gas, such as natural gas, in either a simple single or a dual chambered reactor and heat exchanger.

It is a further object of this invention to provide a simple method of conserving the heat of reaction so that no heat need be added to the system even though the catalytic exothermic reduction reaction only proceeds at elevated temperatures.

These and other objects are accomplished according to our invention wherein a reaction mixture of gas, rich in sulfur dioxide, together with a reducing gas such as methanerich natural gas, said mixture being at a temperature of between 500° and 700°F., preferably between 550° to 650°F., is passed through a preheated pervious bed of refractory material wherein it is heated to about 1,000°–1,800°F., preferably 1,400°–1,600°F., then through a preheated pervious bed of catalytically active refractory material, and finally through a second but unheated bed of pervious refractory material which is similar to the first, and between the two of which is sandwiched the catalytically active bed.

During the exothermic reaction, the temperature of the product gases is raised about 200° to 400°F. to about 1,700°–2,500°F. As the gases continue to flow in one direction, the temperature of the first heat sink, or bed of non-catalytic material drops as it gives up its heat to the incoming reaction mixture. Correspondingly, the hot product gases being cooled by the unheated bed of refractory material heat up this bed. The first bed soon loses its ability to heat the incoming reaction mixture sufficiently, and the last bed loses its ability to cool the product gases sufficiently. Preferably, before this point is reached, the flow of gas is reversed in direction by means of a four-way switch valve or other valving means so that the relatively cool reaction mixture is heated by the hot pebble bed previously heated by the hot product gases, whereas the hot product gases are cooled by the pebble bed which had previously given up its heat to the incoming reaction mixture. This reversal of gas flow is made to occur at intervals so as to maintain essentially optimum conditions.

The reaction mixture must always be heated to a temperature sufficient to start the exothermic reaction. The temperature required will depend on the activation temperature of the particular catalyst chosen. Furthermore, the product gas should not be cooled beyond the point at which the sulfur vapor contained therein will condense. (This temperature, which is the "dew point" for the contained sulfur varies with the sulfur content of the exit gas which is, in turn, a function of the sulfur dioxide content of the inlet gas). As the temperature build-up can exceed that desired for optimum operation, a by-pass is provided so as to permit a portion of the hot product gas to leave the catalyst bed or preferably the non-catalytic refractory bed at a point adjacent to the catalyst bed, just after the reaction has taken place. The by-pass being used will vary with the direction of gas flow, always being the one which will remove the hot product gas just after the reaction. The amount removed at this point can be varied to maintain the reaction temperature within the desired limits (1,500°–2,500°F., preferably between 1,700° and 2,000°F. when calcium aluminate is the chosen catalyst).

In another embodiment, two essentially identical chambers are employed rather than one, and the catalyst bed overlays the non-catalytic pervious refractory bed in each chamber.

It will be seen that this is only a modification of the single chambered unit. If the single chamber were bisected at right angles to its axis and the severed ends of the two sections were sealed except for a conduit between them, the two chambered system would be achieved. It should be pointed out, however, that in the example cited, each chamber would have one-half the amount of catalyst contained in the original single unit. Since the amount of catalyst in the single unit should be sufficient to permit the reaction to reach equilibrium before withdrawing the temperature controlling by-pass gas, it follows that the amount of catalyst in the two "half units" should be increased until the depth in each is essentially equal to that in the original single unit.

At the beginning of each cycle in the two chamber system, the non-catalytic and the catalytic beds in one chamber are preheated whereas the corresponding beds in the other are essentially cool. The gases comprising the reaction mixture which are relatively cool (about 600°F.) enter the preheated non-catalytic pebble bed and pass into the overlaying preheated catalyst bed at a temperature at least equal to the activation temperature of the chosen catalyst. In the case of a calcium aluminate catalyst, this is about 1,500°F. minimum. The exothermic reaction raises the temperature of the product gas to about 200° to 400°F. to preferably 1,700° to 2,000°F. in the case of the aforementioned catalyst. The hot product gases leave the top of this chamber, and passing through a conduit, come down through the catalyst bed and beneath it into the non-catalytic pebble bed of the second chamber, heating both. The relatively cool product gases which, however, are still above the dew point for the contained sulfur, leave the system at this point for further processing. In both the single chamber system and the dual chamber system, gas velocities are such as to provide contact times with the preheated catalyst of between 0.25 to 3.0 seconds, preferably between 0.5 and 1.5 seconds.

As with the single unit, the direction of gas flow is periodically reversed by means of a four-way switch valve or other valving means, before the cool pebble stove heats to the point where the product gas is exiting at too high a temperature to maintain thermal balance and/or the hot pebble stove cools to the point where it is delivering the reaction mixture to the catalyst bed at too low a temperature (below the activation temperature for the chosen catalyst). Since, as with the single chambered unit, more heat is produced than needed, excessively high temperatures may develop in the catalyst bed. A by-pass conduit is positioned to bleed part of the product gas flow, which ordinarily supplies heat to the cool bed, and direct it to the Claus unit, or to any other chosen processing step.

The sulfur dioxide, which is reduced in the present process, may be essentially pure or its concentration in the stream of metallurgical gas being processed may be as low as, but no lower than 5.0 percent (by volume), the other components comprising essentially oxygen, nitrogen, carbon dioxide and water vapor.

As reducing agents, at least one of carbon monoxide and hydrogen or any of the gaseous hydrocarbons may be employed. The preferred gaseous hydrocarbons for use in the present process are the normally gaseous hydrocarbons which contain from 1 to 4 carbon atoms and include natural gas, which is a mixture usually comprising hydrogen, methane, ethane, propane, the butanes, the pentanes, nitrogen, carbon monoxide and carbon dioxide. The choice of hydrocarbon is usually based on cost rather than technical considerations. Carbon monoxide and hydrogen may be employed individually or combined as by-product gases of other chemical reactions; for instance, producer gas, water gas, and synthesis gas, each of which contains hydrogen and carbon monoxide in various proportions. Other gases wherein either carbon monoxide and/or hydrogen are the predominant components may be effectively utilized so long as they are capable of reducing the sulfur dioxide at an efficient rate.

As mentioned above, the temperature necessary to effect equilibrium in the reduction of the sulfur dioxide in the practice of the present invention is from about 1,200° to 2,500°F., preferably about 1,700° to 2,000°F., depending on the chosen catalyst.

Any of the well-known catalysts previously employed for the reduction of sulfur dioxide may be used, e.g., bauxite, alumina, silica, calcium sulfide, vanadium oxides and the like. A catalyst which has been found unexpectedly effective, however, in the conversion of sulfur dioxide to elemental sulfur and/or other gaseous sulfur compounds at temperatures preferably from 1,700° to 2,000°F. in the presence of one of the aforementioned reducing agents is calcium aluminate as disclosed in patent application Ser. No. 809,996, filed Mar. 24, 1969, now abandoned.

The reduction of sulfur dioxide employing a gaseous hydrocarbon as the reducing agent is carried to equilibrium, in the reduction of the sulfur dioxide to elemental sulfur and/or sulfur-containing-gases, with the major proportion of the products being sulfur and/or hydrogen sulfide. The mol ratio of reactants (sulfur dioxide:reducing gas) should be in the order of about 1.33 to 2.0:1, with a preferred ratio of sulfur dioxide to reducing gas of 1.7 to 1.9:1.

The residence times necessary to achieve equilibrium between the reaction of the sulfur dioxide containing gas with the reducing gas in the catalyst bed is in the range of about 0.25 to 3 seconds, preferably 0.5 to 1.5 seconds, with superficial linear gas velocities, assuming a bed voltage of 50 percent, of ⅓ to 20 feet per second, preferably 2 to 10 feet per second. At contact time of less than 0.25 seconds, conversion is incomplete, whereas contact times in excess of 3 seconds provide no benefits since equilibrium has already been reached. At superficial velocities of less than about ⅓ foot per second, the vessel diameter becomes impractically large, and with superficial gas velocities in excess of 20 feet per second, a sharp increase in pressure drop is obtained across the catalyst bed, with a corresponding increase in power costs.

FIG. 1 illustrates diagrammatically one embodiment of the present invention, whereas FIG. 2, illustrating a modification of the first, represents a second and preferred embodiment. In both figures the sulfur-dioxide-containing gas, such as roaster off-gas from the smelting of pyrrhotite ore, containing approximately 13 percent sulfur dioxide, 86 percent nitrogen and 1 percent oxygen on a dry basis, typically at a temperature of about 550°–650°F., enters the system via conduit 7. A reducing agent, such as methane, sufficient to produce the desired mol ratio of sulfur dioxide and reducing gas in the reaction mixture, and of $H_2S:SO_2$ in the product gases, is introduced via conduit 9 and mixed with the $SO_2$-containing gas in conduit 11. The gas mixture passes through flow-reversing valve 13 and follows the path indicated by the solid lines. Any suitable valving arrangement may be used which will handle the volume of hot gases and accomplish the desired reversal of flow. The gases which leave the flow-reversing valve 13 when in the position indicated, pass through conduit 17 to heat exchanger chamber 3. Chambers 3 and 4 are packed with a suitable heat sink material such as refractory brick, pebbles, balls, pellets, or the like. This packing material, which has been heated during a previous cycle, cools off as the reaction gases pass through it. The heat which is released from the packing raises the temperature of the reaction gases for entry into the catalyst bed and reactor area 5. Since the temperature in heat sink 3 is constantly changing during this cycle, the temperature of the gases entering the catalyst bed 5 will vary but must not be allowed to drop below the catalyst activation temperature or to be so high that temperatures which will physically damage the selected catalyst, will develop in the catalyst bed. As the gases reach the catalyst bed which has also been preheated, the exothermic reduction reaction takes place raising the temperature of the product gas by 200°–400°, preferably to between 1,700° and 2,000°F. in the case of a calcium aluminate catalyst.

In the case of FIG. 1, the hot product gas continues into the relatively cool heat sink 4 where it gives up much of its heat in raising the temperature of the packing comprising the heat sink. In the case of FIG. 2, the hot product gas passes through conduit 19 to the relatively cool catalyst bed 6, and heat sink 4 beneath it, to both of which it gives up much of its heat.

In the case of both FIG. 1 and FIG. 2, the partially cooled product gas, which, however, is still above the dew point of the contained elemental sulfur, leaves the heat sink through conduit 15 to flow-reversing valve 13, which directs it through line 25 to a Claus unit 33, or to any other chosen point for further processing.

Generally, in from two to ten minutes of flow, pebble bed 3 will become less effective as a heat source, thereby supplying the catalyst bed with a reaction mixture at less than the desired temperature. Correspondingly, pebble bed 4 will have become too hot to effectively cool the product gas. Flow-reversing valve 13 is then switched to divert the incoming reaction mixture at line 11 through line 15 to hot pebble bed 4, and to divert the returning hot product gases to the relatively cool pebble bed 3 (and in the case of FIG. 2, to catalytic bed 5, as well).

The gas exiting through lines 25 to 33 normally contains an excess of hydrogen sulfide over that required by the Claus reaction of two volumes of hydrogen sulfide for each volume of sulfur dioxide. A portion of the sulfur dioxide feed may therefore be by-passed through line 29 to adjust the gas mixture fed to the Claus unit.

Since more heat is produced by the exothermic reaction than needed, the three-way switch valve 21 of FIG. 1 can direct part of the hot product gas, just after it has reached equilibrium in the catalyst bed, through conduits 19 or 20, through valve 23 and conduit 27 to the Claus unit at 33. This valve 21 is always operated in conjunction with flow-reversing valve 13, so that the port opened is always that which will allow the passage of hot product gas (gas which has traversed both the pebble bed packing and the catalyst bed). The amount bled off to the Claus unit at 33 is controlled by valve 23 to thus provide the means of removing excess heat from the system which would otherwise cause the overheating of the pebble bed, and hence the catalyst bed.

In the system represented by FIG. 2, excess heat is removed from the system by by-passing a portion of the hot product gas through conduits 22, 27 and 25, and valve 23, which would otherwise serve to overheat the catalyst bed and pebble bed.

EXAMPLE 1

Sulfur dioxide roaster gas containing 10.6 percent sulfur dioxide by volume is reacted with methane in the mol ratio of 1.7:1 ($SO_2/CH_4$) according to the procedure of the present invention employing the apparatus of FIG. 1. The reactants flow through conduit 11, switch flow valve 13, conduit 17 (or 15), and enter the preheated pebble bed or heat sink 3, consisting of fire clay balls, at a temperature of about 580°–600°F. The reaction mixture passes through the hot pebble bed wherein it is raised to a temperature of 1,780°F. and enters the catalyst bed consisting of spherical bodies comprising calcium aluminate supported on an alumina base. The superficial linear gas velocity through the system is about 5.0 feet per second, with a gas contact time of about 1.0 second. A portion of the hot gas is bled off through conduit 20, to thus by-pass pebble-stove 4, and thereby limit the temperature to be attained in preheating the pebble bed. The flow of reactants is thereafter reversed approximately every 6 minutes by the manipulation of switch valve 13. When the reactants enter pebble bed 4, conduit 19 is used to bleed off a portion of the hot product gas and with it excess heat which otherwise would cause excessive temperature build-up in the catalyst bed. Conversely, when the reactants enter pebble bed 3, conduit 20 is used to bleed off a portion of the hot product gas as a method of temperature control. This bleed-off of hot product gas through valve 23 and line 27 to the Claus unit at 33 is adjusted until the maximum temperature of the catalyst is maintained at about 2,000°–2,300°F.

The major portion of the product gas is cooled by passage through that pebble bed which has just given up most of its heat to the incoming reactants on the previous cycle. In so doing it reheats that pebble bed in preparation for the succeeding cycle.

A typical analysis of the reaction mixture in mol percent entering the system through conduit 11, and leaving the system at 25, is given below:

|  | $SO_2$ | $O_2$ | $H_2$ | $N_2$ | $CH_4$ | $H_2O$ | $H_2S$ | CO | $CO_2$ | S |
|---|---|---|---|---|---|---|---|---|---|---|
| Entering | 10. | .8 | — | 68.4 | 5.8 | 15.0 | — | — | — | — |
| Leaving | 1.8 | — | 2.1 | 68.3 | — | 17.4 | 2.0 | 1.1 | 4.4 | 2.8 |

A comparison will be drawn between the operation of this single unit system and that of the two unit system to follow.

EXAMPLES 2 & 3

Sulfur dioxide roaster gas, containing 10.6 percent sulfur dioxide by volume, is reacted with methane according to the procedure of the present invention employing the apparatus of FIG. 2. Two runs are made, constituting Examples 2 and 3. The reactants flow through conduit 11, switch flow valve 13, conduit 17 (or 15) and enter the preheated pebble bed or heat sink 3 at a temperature of about 580°–600°F. The reaction mixture passes through the hot pebble bed wherein it is raised to a temperature of about 1,650°F. and enters a catalyst bed having the same physical form and composition as that used in Example 1. The superficial linear velocity through the system is about 5 feet per second, with a contact time of about 1 second. Maximum temperature attained in the catalyst bed is 2,250°F. A portion of the hot gas is bled off through conduit 22 to thus by-pass catalyst bed 6 and pebble bed 4 and thus limit the temperature to be attained in preheating. The flow of reactants is thereafter reversed approximately every 6 minutes. The bleed-off of hot product gases through conduit 22, valve 23 and conduits 27 and 25 to the Claus unit at 33 is adjusted until the maximum temperature of the catalyst is maintained at about 1,850°–2,050°F.

The major portion of the product gas is cooled by passage through that pebble bed which has just given up most of its heat to the incoming reactants on the previous cycle. In so doing, it reheats that pebble bed in preparation for the succeeding cycle.

A typical analysis of the reaction mixture in mol percent entering the system through conduit 11, and the product gas leaving the system at 25, is given below. We do not say "leaving at 33," as this would include the bleed-off gases from line 27, and the pure unreacted metallurgical gas entering from conduit 29 through valve 31 (to adjust the ratio of $H_2S$ and $SO_2$ going to the Claus unit).

What is claimed is:

1. A continuous method for the preparation of sulfur from a sulfur-dioxide-containing gas which consists essentially in the steps of:
   a. preparing a gaseous reaction mixture of said sulfur-dioxide-containing gas and a gaseous reducing agent selected from the group consisting of at least one of hydrogen, carbon monoxide and a gaseous hydrocarbon,
   b. preheating said gaseous reaction mixture to a temperature within the range of about 500° to 700°F.,
   c. passing said preheated gaseous reaction mixture in direct heat exchange relationship with a first section of gas permeable bed of a solid, refractory, catalytically-inert material to raise the temperature of the gaseous reaction mixture to between 1,000° and 1,800°F.,
   d. passing said heated gaseous reaction mixture from (c) through a bed of catalytically-active material and under equilibrium reaction conditions to effect reduction of said sulfur dioxide to a product gas stream consisting essentially of sulfur and hydrogen sulfide while maintaining the temperature in said catalytic bed within the range of 1,200° to 2,500°F. and a rise in the temperature of the product gas stream exiting from said catalyst bed of between 200° and 400°F.,
   e. passing said product gas stream in direct heat exchange relationship through a second section of solid, refractory, catalytically-inert material to reduce the temperature of said product gas stream to about 850° to 1,000°F.,
   f. periodically by-passing the second section of catalytically inert bed with the hot product gases to control the temperature of the reaction,
   g. reacting the hydrogen sulfide in the product gas stream with sulfur dioxide under reaction conditions sufficient to effect reaction of the hydrogen sulfide and sulfur dioxide to produce elemental sulfur and recovering said sulfur; and
   h. continuously reversing the direction of flow of said gaseous reaction mixture through said beds to

|  | $SO_2$ | $O_2$ | $H_2$ | $N_2$ | $CH_4$ | $H_2O$ | $H_2S$ | CO | $CO_2$ | S |
|---|---|---|---|---|---|---|---|---|---|---|
| Entering |  |  |  |  |  |  |  |  |  |  |
| Example 1 | 10. | .8 | — | 68.4 | 5.8 | 15. | — | — | — | — |
| Example 2 | 10. | .8 | — | 68.4 | 5.8 | 15. | — | — | — | — |
| Example 3 | 10. | .8 | — | 68.4 | 5.8 | 15. | — | — | — | — |
| Leaving |  |  |  |  |  |  |  |  |  |  |
| Example 1 | 1.8 | — | 2.1 | 68.3 | — | 17.4 | 2.0 | 1.1 | 4.4 | 2.8 |
| Example 2 | 1.65 | — | 1.7 | 68.3 | — | 17.5 | 2.4 | .78 | 4.8 | 2.8 |
| Example 3 | 1.65 | — | 1.65 | 68.3 | — | 17.3 | 2.5 | .72 | 5.0 | 2.8 |

There is comparatively little difference between the runs; however, the single unit of FIG. 1 tends to run hotter than the double unit of FIG. 2 and is more difficult to control. The higher temperatures shorten the life of the catalyst — causing more rapid destruction of the spherical bodies. For this reason, the two unit system is preferred.

It is to be understood that other variations of the invention than those illustrated and described are intended to be included within the scope of the appended claims.

maintain said catalyst bed at a temperature within the range of 1,200° to 2,500°F. without adding to any of said beds additional heat other than the heat resulting from the reduction reaction effected in the catalytic reaction zone.

2. The method of claim 1, wherein the reaction mixture is preheated to at least 1,500°F. and leaves the catalyst bed at a temperature of between 1,700°–2,000°F.

3. The process of claim 1, wherein the reactor system consists of one reactor vessel containing the catalytically-active refractory material positioned between the catalytically inert refractory material.

4. The process of claim 1 wherein the reactor system consists of two vessels, each of which contains a section of catalytically-active refractory material and a section of catalytically-inert refractory material.

5. The method of claim 1 wherein the equilibrium reaction conditions in the catalytic bed include the gaseous reaction mixture being in contact with said catalytic bed for a period of time from ¼ to 3 seconds while passing through said catalytic bed at a superficial linear gas velocity of from ⅓ to 20 feet per second.

6. The process of claim 1, wherein the ratio of sulfur dioxide to reducing gas is in the range of 1.0 to 6.5:1 and the temperature in the catalyst section is 1,700°–2,000°F.

7. The process of claim 5, wherein the actual contact time in the reactor system is between 0.33 and 1.0 second.

8. The process of claim 5, wherein the superficial linear gas velocity of the reaction gases passing through the catalyst bed is 2 to 10 feet per second.

9. The process of claim 1, wherein the catalytic material is calcium aluminate catalyst.

10. The process of claim 1, wherein the reducing agent is hydrogen.

11. The process of claim 1, wherein the reducing agent is carbon monoxide.

12. The process of claim 1, wherein the reducing agent is a gaseous hydrocarbon selected from the group consisting of natural gas and a low molecule weight hydrocarbon of 1 to 4 carbon atoms.

13. The process of claim 12, wherein the gaseous hydrocarbon is natural gas.

14. The process of claim 12, wherein the gaseous hydrocarbon is methane.

15. The process of claim 14, wherein the ratio of sulfur dioxide to methane is in the range of 1.33 to 2.0:1.

* * * * *